Patented July 25, 1933

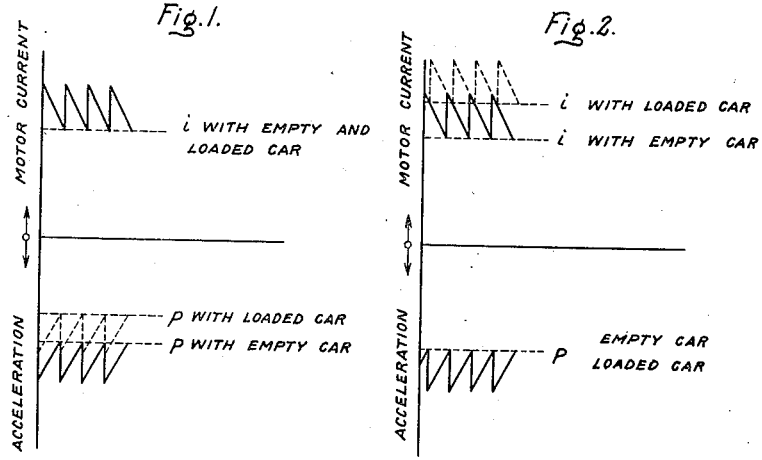
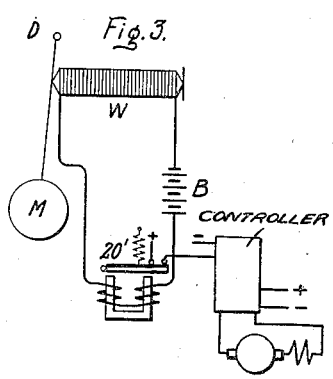
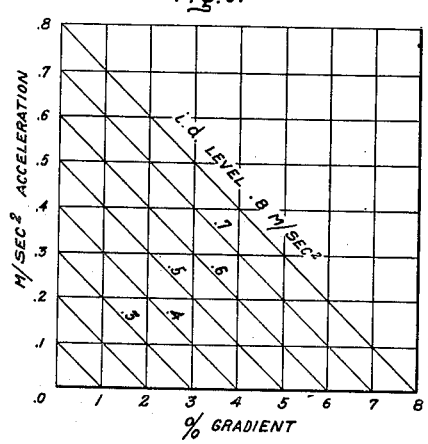
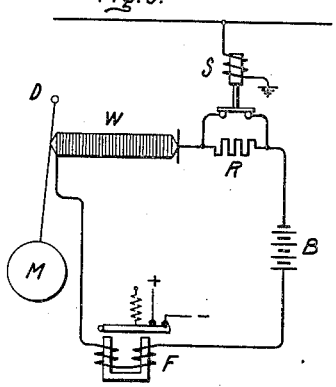
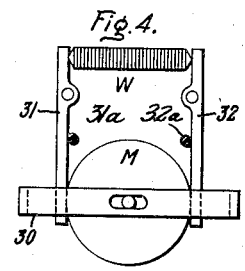
Inventor:
Otto Wünsche
by Charles E. Mullan
His Attorney.

1,919,996

UNITED STATES PATENT OFFICE

OTTO WÜNSCHE, OF BERLIN-FRIEDENAU, GERMANY, ASSIGNOR TO GENERAL ELECTRIC COMPANY, A CORPORATION OF NEW YORK

ACCELERATION RESPONSIVE DEVICE FOR CONTROLLING ELECTRIC MOTOR-DRIVEN VEHICLES

Application filed October 28, 1929, Serial No. 403,110, and in Germany November 1, 1928.

My invention relates to acceleration responsive devices for the control of electric motor-driven vehicles and one of its objects is to provide an improved form of acceleration responsive device whereby such control may be rendered, at least partly, automatic in response to the acceleration of the vehicle.

Hitherto the acceleration, when starting, and the retardation, when braking such vehicles, have been regulated in accordance with the motor current. In hand controlled vehicles the driver cuts in the starter steps according to the deflection of the current meter inserted in the motor circuit. In automatically controlled vehicles such, for example, as shown in the Tritle Patent No. 1,382,872, relays energized by the motor current are provided which switch in the next step when the current drops to a predetermined value. In both cases the current is so regulated that a predetermined motor current intensity is not overstepped, no matter whether the car is loaded or unloaded or whether a number of trail cars has to be carried along by the motor car.

Thus the accelerating resistance steps are so controlled in either case that the motor current varies between two limit-values. In consequence thereof the acceleration of the motor car obtained by the motor current varies between two values which values depend upon the car load. The acceleration is higher when the car is unloaded and lower when the car is loaded. For heavy loads it may be sometimes impossible to run the car according to schedule.

Heretofore a device has been used by which the starting acceleration is held constant irrespective of the car load. Obviously in this case the motor current in the circuit of the loaded vehicle is greater than if it is not loaded. In this device the variation of the distance between car body and the chassis, which is dependent on the load controls a device which influences for instance the energizing coil of an actuating relay and increases the motor current when the car is loaded. Such device for controlling the energizing coil of the actuating relay has a complicated construction in so far as it must be secured against shocks and spring vibrations during the running of the car. Adjustment of the device can therefore be effected only while the car is stopping. When the car is under way, the controlling device is locked together with the doors. A particular drawback of such a device is that it is influenced only by the load of the motor car itself, but not by the number of trail cars.

My invention avoids this drawback by providing a pressure responsive variable resistance device for controlling and adjusting the current in a circuit in response to the pressure set up by a movably mounted inertia mass due to acceleration and retardation of the vehicle. This device controls a current circuit provided with a meter calibrated in acceleration values, if the car is regulated by hand, and with an actuating relay if the car is controlled automatically.

In the drawing, Figs. 1 and 2 are charts showing respectively the characteristics of the current limit system of acceleration and the acceleration obtained with the device of the present invention; Fig. 3 is a schematic diagram of a simple form of the present invention; Fig. 4 shows a modified form of the pressure responsive variable resistance element and movably mounted inertia mass; Fig. 5 is a chart illustrating the variation obtained with the improved acceleration responsive device of the present invention in accordance with the gradient upon which the vehicle is operating and Fig. 6 is a circuit diagram showing schematically a modification of the acceleration control arrangement of Fig. 3 providing for remote independent control of the acceleration responsive device.

As shown in Fig. 1 whenever the current limit system of starting the vehicle is employed, the motor current varies between two limiting values which are substantially constant. Hence, as indicated in the charts, the acceleration obtained depends upon whether the vehicle is loaded or empty.

Fig. 2 shows the current and the acceleration if the starter steps are switched in on a predetermined value of the acceleration, independent of the load and the number of the trail cars. Of course the current input is greater when the car is loaded than when it is unloaded.

In Fig. 3 a device embodying my invention is illustrated diagrammatically by way of example. M is a movably mounted inertia mass arranged for rotation about the axis D. The mass M transmits the acceleration pressure imparted to it, when the car is started, by means of rods to a resistor W comprising a pile of plates consisting of carbon or the like. Such a resistor is known to vary its resistance when the pressure exerted on it varies, so that the resistance is small at high pressures and large at low pressures. The resistor W is connected to a substantially constant voltage source of current B shown as a battery and to the winding of the actuating relay F. The relay is adjusted in such manner that, when acceleration drops to the low limit value, the armature is released and inserts the next succeeding starter step in substantially the same manner as occurs upon operation of the current limit acceleration relay of the previously mentioned Tritle patent. Fig. 3 only shows the coil and the armature of the actuating relay, the other constructional elements, which are well known in the art, being omitted. In the case of hand control instead of the actuating relay a meter calibrated in acceleration values is arranged at the driver's seat.

Fig. 4 shows the mass M supported in a sliding bearing and connected to the resistor in such manner that a predetermined value of acceleration is maintained in going forward as well as rearward and also when braking in both directions. This is accomplished by slidably mounting the mass M in the supporting frame 30 on the vehicle so that the mass may move backward and forward to a limited degree. A pair of operating levers 31 and 32 are centrally pivoted to engage at one end with the opposite sides of the sliding mass M and each provided with a corresponding stop member 31a and 32a positioned so as normally to maintain the mass centrally within its limits of motion. The pressure responsive variable resistance W is supported between the free ends of the operating levers 31 and 32 so as to be responsive to the pressure exerted thereon by either of the levers.

Thus, when the vehicle is operated in a direction to move the supporting frame 30 to the right, the mass M, due to its inertia, exerts a pressure upon the operating lever 31 which is effective to compress the plurality of plates composing the resistor W. Likewise, when the vehicle is operated in the direction to move the frame 30 to the left, the pressure exerted due to the inertia of the mass M is transmitted through the lever 32 to compress the resistor W. It will be understood that the resistor W is connected to control the energization of an electroresponsive acceleration controlling means for the vehicle in the same manner as shown in Fig. 3 or Fig. 6.

My invention has further regard to the fact that the acceleration which effects the insertion of the next step by the actuating relay is varied when the car is started uphill because the resistor W is influenced not only by the acceleration pressure but also by the gravity component of the mass M. In consequence thereof the acceleration effecting a stepping up of the starter decreases in proportion as the gradient of the vehicle increases.

Fig. 5 illustrates the variation of the acceleration in dependency from the gradient. An actuating relay adjusted for instance to operate at 0.6 m/sec.$^2$ in level country would operate at 0.2 m/sec.$^2$ at an incline of 4%. In a hand-controlled car the meter which directs the driver in switching the starting steps would indicate in the same manner. Although as a rule a decrease of the acceleration is desired when the car starts on an incline, sometimes the same acceleration when starting on an incline is desired also on level ground. The driver should therefore be enabled to influence, if desired, the actuating relay or the signal meter by appropriate means. A preferred embodiment of such device is illustrated diagrammatically in Fig. 6. Here R is a resistor connected in series to the pressure-influenced resistor W and short-circuited by the relay S when the car runs on level ground or slightly uphill. In order to be able to increase the acceleration limit if the car is running up a steeper incline or also on level ground, the relay S is energized by means of a separate circuit (comprising a line traversing the train if the train comprises several motor cars controlled from the driver's seat). When the relay S is energized, the resistor R is inserted in the circuit and the energization of the actuating relay F is decreased so that it operates at a lower current value than before. Instead of the relay F a meter may be used, the difference in deflection indicating that the driver should switch in the starter at a lower acceleration than before.

Obviously my invention is not limited to the use of current sensitive devices since voltage sensitive devices may be used in correspondingly varied arrangement and various changes may be made in the details disclosed in the foregoing specification without departing from the invention or sacrificing the advantages thereof.

What I claim as new and desire to secure by Letters Patent of the United States is:

1. A controlling device for electric motor driven vehicles comprising a circuit, a pressure responsive variable resistance element connected to control the current in the circuit, electroresponsive acceleration controlling means for the vehicle having an operating winding connected to be energized in accordance with the current in the circuit, an inertia mass movably mounted to be responsive to the acceleration of the vehicle in both the forward and reverse directions, and a pair of operating members associated with said inertia mass, one for varying the pressure on said resistance element upon movement of said inertia mass in response to acceleration of the vehicle in one of said directions, and the other for varying the pressure on said resistance element upon movement of said inertia mass in response to acceleration of the vehicle in the other of said directions.

2. A controlling device for electric motor driven vehicles comprising a circuit, a pressure responsive variable resistance element connected to control the current in said circuit, electroresponsive acceleration controlling means for the vehicle having an operating winding connected to be energized in accordance with the current in the circuit, an inertia mass movably mounted to be operated responsively to the acceleration of the vehicle and mechanically connected to vary the pressure on said resistance element, a second resistance element connected to control the current in said circuit for varying the rate of acceleration of the vehicle, and independently operable control means for said second resistance element.

3. In combination with an electrically operated vehicle, motor means for driving said vehicle, speed control means operable through a plurality of steps for accelerating said motor, of means responsive to the acceleration of said vehicle for operating said speed control means to effectuate a constant rate of acceleration of the vehicle irrespective of its load.

4. Means for producing uniform rates of acceleration of an electrically driven vehicle irrespective of the load imposed on said vehicle comprising, a driving motor for said vehicle, control means for accelerating said motor, operating means for operating said control means step by step, an accelerating relay for controlling the rate at which said steps are taken comprising an armature having an operating winding, a variable resistance element connected to control the energization of said winding, and an inertia mass mounted for movement in accordance with the acceleration of said vehicle for controlling said resistance element.

5. Means for uniformly accelerating an electrically driven vehicle irrespective of the load imposed upon said vehicle comprising a motor for driving said vehicle, a controller operable through a plurality of accelerating steps for controlling the energization of said motor, a relay for controlling the rate of movement of said controller, a winding for said relay, a pressure responsive variable resistance connected in circuit with said winding to control its energization, and an inertia mass mounted for movement to apply a pressure to said resistance in response to acceleration of said vehicle and thereby control the operation of said relay.

OTTO WÜNSCHE.